(12) United States Patent
Chueh et al.

(10) Patent No.: US 8,022,671 B2
(45) Date of Patent: Sep. 20, 2011

(54) BATTERY UNDER-VOLTAGE PROTECTION

(75) Inventors: Yung Fa Chueh, Hsichin (TW); Wen-Yung Chang, Chungli (TW); Chia Fa Chang, Linkou Township (TW); Tun Chieh Liang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 860 days.

(21) Appl. No.: 12/020,300

(22) Filed: Jan. 25, 2008

(65) Prior Publication Data

US 2009/0193277 A1 Jul. 30, 2009

(51) Int. Cl.
*H02J 7/00* (2006.01)
*G06F 1/00* (2006.01)
(52) U.S. Cl. .................................. 320/127; 713/340
(58) Field of Classification Search .............. 320/112, 320/136, 127, 135, 152, 157, 162; 713/340; 700/79, 81; 361/78, 79, 86, 87
See application file for complete search history.

(56) References Cited

U.S. PATENT DOCUMENTS

| | | | |
|---|---|---|---|
| 6,141,634 A | 10/2000 | Flint et al. | |
| 6,545,447 B1 * | 4/2003 | Smith | 320/132 |
| 6,958,680 B2 | 10/2005 | Kline | |
| 6,965,303 B2 | 11/2005 | Mollenkopf | |
| 7,046,882 B2 | 5/2006 | Kline | |

* cited by examiner

*Primary Examiner* — Richard V Muralidar
(74) *Attorney, Agent, or Firm* — Haynes and Boone, LLP

(57) ABSTRACT

A battery includes a cell and a battery management unit coupled to the cell. The battery management unit is operable to determine whether a battery controller is operating when the cell is coupled to an information handling system that includes the battery controller. In response to determining that the battery controller is not operating, the battery management unit is operable to determine whether the cell comprises a battery voltage that is below a predetermined voltage level.

20 Claims, 3 Drawing Sheets

BATTERY UNDER-VOLTAGE PROTECTION

BACKGROUND

The present disclosure relates generally to information handling systems, and more particularly to under-voltage protection for a battery used with an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs such as, for example, portable IHSs, include batteries to enable their portability. Batteries have an operating voltage range under which the operating of that battery will reduce the life of the battery. For example, the operating voltage of a Lithium-Ion battery may range from 3 to 4.2 volts. If the Lithium-Ion battery is repeatedly discharged below that range, the Lithium-Ion battery will not be able to retain 75% of its rated charge capacity after 300 full charge/discharge cycles at 25 degrees Celsius. In order to conserve batteries and reduce cost, it is desirable to ensure that the life of the battery is maximized.

Typically, the battery may be prevented from being over-discharged by using a battery controller in the IHS to detect a voltage trigger point and, once the battery voltage reaches that trigger point, turn off the discharge field effect transistor (FET) in the battery with the battery controller in order to prevent the drawing of power from the battery.

However, there may be situations where it is desirable to draw power from the battery when the IHS is either not operating or operating in a reduced power mode. When the IHS is not operating or operating in a reduced power mode, the battery controller in the IHS may be disabled and unable to turn off the discharge-FET. This can result in the battery being over-discharged, resulting the problems described above.

Accordingly, it would be desirable to provide for improved under-voltage protection for a battery.

SUMMARY

According to one embodiment, a battery includes a cell and a battery management unit coupled to the cell, wherein the battery management unit is operable to determine whether a battery controller is operating when the cell is coupled to an IHS that includes the battery controller and, in response to determining that the battery controller is not operating, determine whether the cell comprises a battery voltage that is below a predetermined voltage level.

BRIEF DESCRIPTION OF THE DRAWINGS

FIG. 2b is a schematic view illustrating an embodiment of the IHS of FIG. 2a.

FIG. 2c is a schematic view illustrating an embodiment of the IHS of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
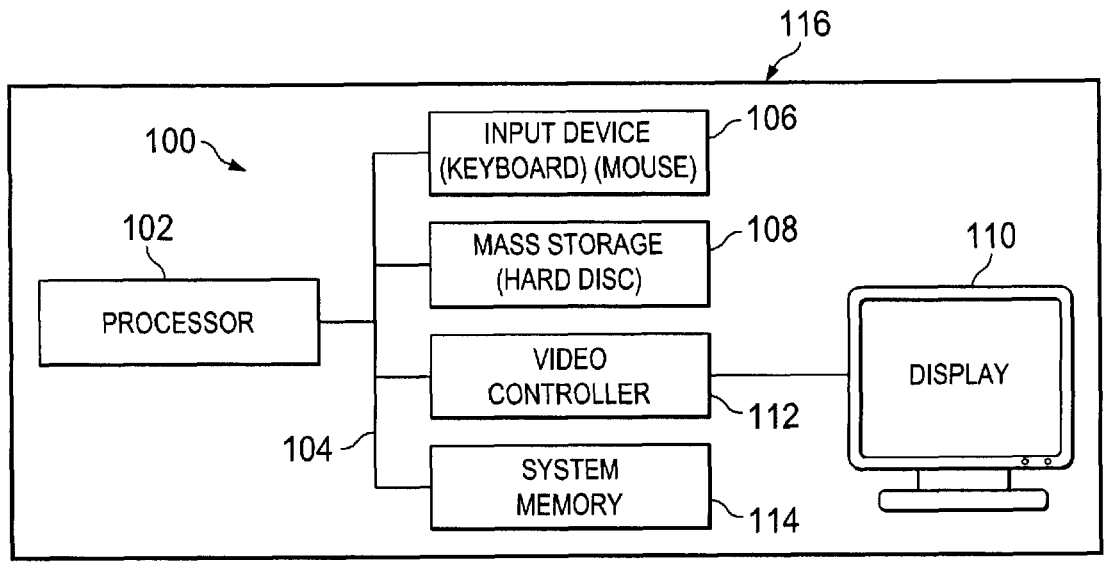
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
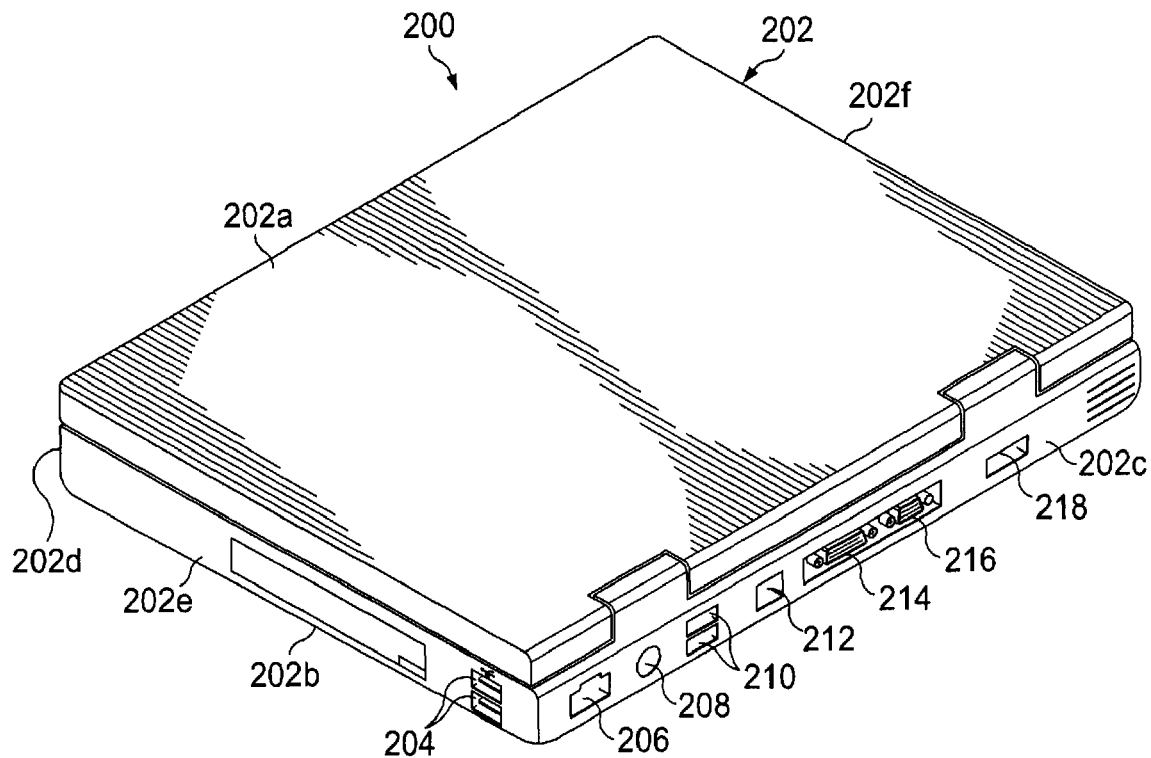
FIG. 2a is a perspective view illustrating an embodiment of an IHS.
Figure 2B:
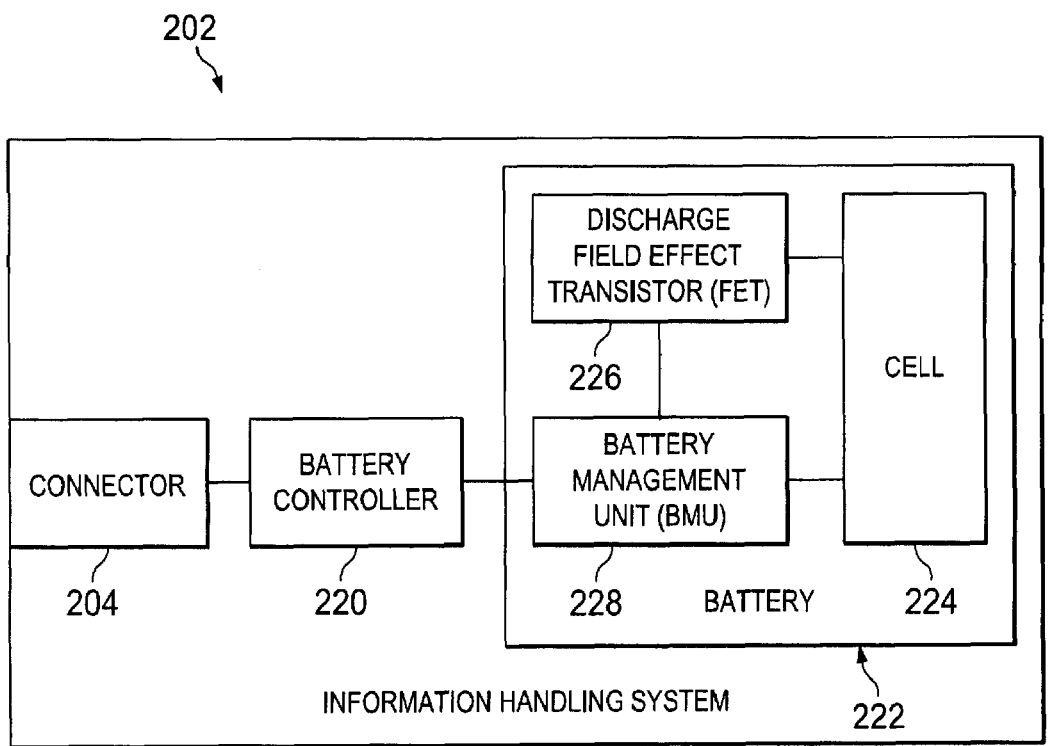

Referring now to FIGS. 2a and 2b, an IHS 200 is illustrated. The IHS 200 may be, for example, the IHS 100, described above with reference to FIG. 1. The IHS 200 includes a chassis 202 having a top surface 202a, a bottom surface 202b located opposite the top surface 202a, a rear surface 202c extending between the top surface 202a and the bottom surface 202b, a front surface 202d located opposite the rear surface 202c and extending between the top surface 202a and the bottom surface 202b, and a pair of opposing side surfaces 202e and 202f extending between the top surface 202a, the bottom surface 202b, the front surface 202c, and the rear surface 202d. A plurality of connectors 204, 206, 208, 210, 212, 214, 216 and 218 are located on the side surface 202e and the rear surface 202c. In an embodiment, the connectors 204 are Universal Serial Bus (USB) connectors. The connectors 204 are coupled to a battery controller 220 that is located in the chassis 202. While the battery controller 220 is illustrated as being coupled to the connector 204, the battery controller 220 may be coupled to any of the connectors 206, 208, 210, 212, 214, 216 and 218 on the chassis 202, to other devices in the chassis 202 of the IHS 200, or to any device that is operable to draw power from the battery 222. The battery controller 220 may be, for example, mounted to a motherboard that is located in the chassis 202 and that includes a plurality of IHS components such as, for example, the processor 102, described above with reference to FIG. 1. In an embodiment, the battery controller 220 may be coupled to the processor 102. A battery 222 is also located in the IHS 200 and includes a cell 224, a discharge FET 226, and a battery management unit 228 coupled together within the battery 222. In an embodiment, the cell 224 comprises a Lithium-Ion cell and/or a variety of other cell types known in the art. In an embodiment, the cell 224 may include a plurality of cells that may be the same type of cell or different cell types, and each cell may be coupled to the discharge FET 226 or may include its own discharge FET to control power draw from that cell with the battery management unit 228. The battery 222 may be coupled to the battery controller 220 through the battery management unit 228, as illustrated, but one of skill in the art will recognize that many different connections may be used to connect the battery 222 to the battery controller 220. In an embodiment, the battery controller 220 is operable to communicate with the battery management unit 228 via a System Management Bus (SMBUS) located on a connector (not illustrated) located on the battery 222.

Figure 2C:
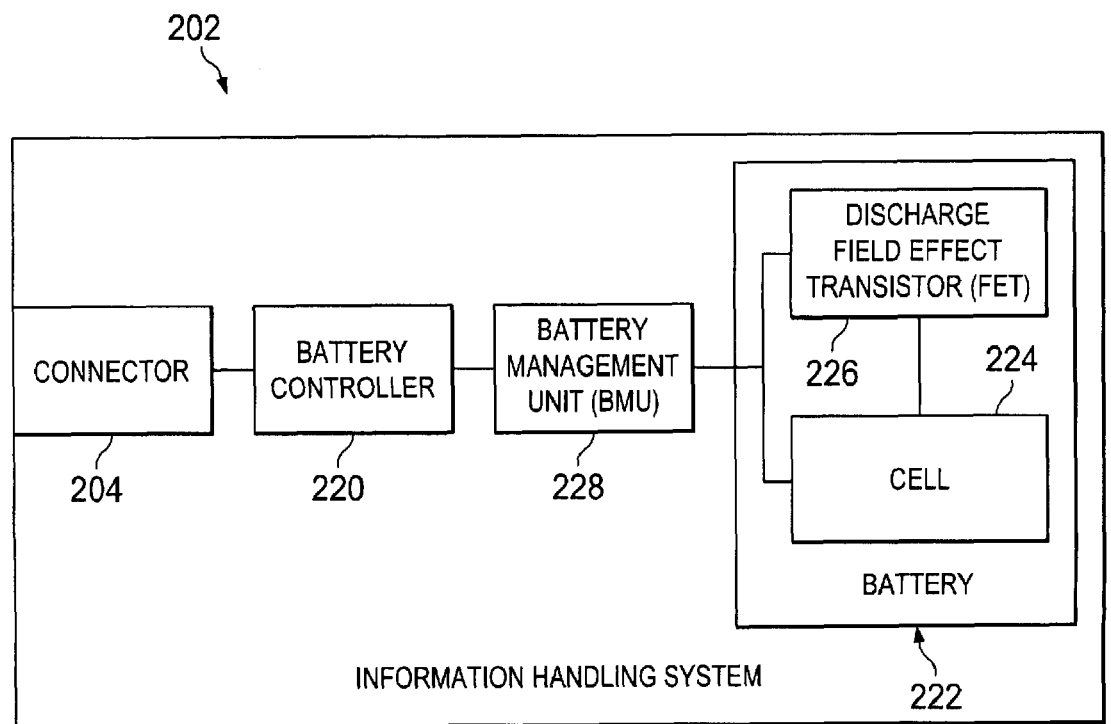
Figure 3:
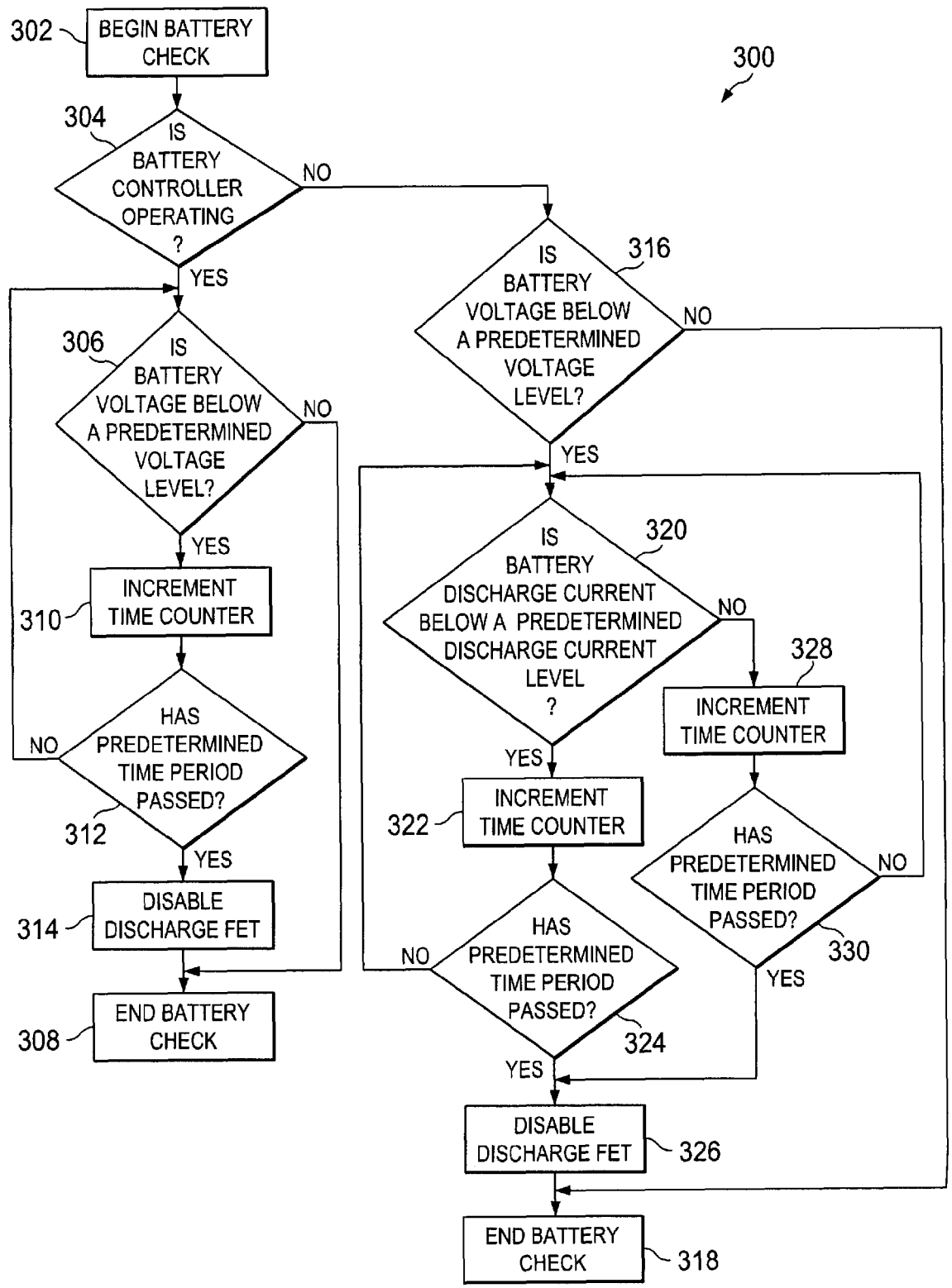
FIG. 3 is a flow chart illustrating an embodiment of a method for battery under-voltage protection.

Referring now to FIGS. 2a and 2c, the IHS 200 may be configured differently than illustrated in FIG. 2b. For example, in the embodiment illustrated in FIG. 2c, the battery management unit 228 may be external to the battery 222. In such an embodiment, the connectors 204 are coupled to the battery controller 220 that is located in the chassis 202. The battery controller 220 is coupled to the battery management unit 228 that is located in the chassis 202 but not within the battery 222. The battery 222 is also located in the chassis 202 and includes the cell 224 and the discharge FET 226. While two embodiments have been illustrated, a variety of different configurations that, for example, either combine and/or separate components of the battery 222 and the IHS 200 are envisioned to fall within the scope of the present disclosure.

Referring now to FIGS. 2a, 2b, 2c, and 3, a method 300 for battery under-voltage protection is illustrated. The method 300 begins at block 302 where a battery check begins. In order to maximize the life of the battery 222 in the IHS 200, a check of the battery 222 according to the method 300 may occur on demand, at scheduled times, after the occurrence of a predefined event, or upon a variety of other battery check situations known in the art. The method 300 then proceeds to decision block 304 where it is determined whether the battery controller 220 is operating. In an embodiment, the IHS 200 may be operable to enter a plurality of different modes such as, for example, reduced power modes that may include a shutdown mode, a standby mode, and/or a variety of other modes known in the art. In one, some, or all of these plurality of different modes, the battery controller 220 may not be operating due to, for example, being shut down by the IHS 200 using a variety of methods known in art. The battery management unit 228 may check whether the battery controller 220 is operating by, for example, determining whether there is communication in the SMBUS between which the battery management unit 228 and the battery controller 220, by communicating with the IHS 200 to determine what mode the IHS 200 is in, and/or using a variety of other methods known in the art. No communication in the SMBUS may indicate that the IHS 200 is in a mode that prevents the battery controller 220 from operating.

If it is determined that the battery controller 220 is operating, the method 300 proceeds to decision block 306 where it is determined whether the battery voltage is below a predetermined level. In an embodiment, the cell 224 in the battery 222 includes a battery voltage that varies as the battery is discharged. The battery management unit 228 may determine that battery voltage using methods known in the art. In an embodiment, the predetermined voltage level when the battery controller 220 is operating is approximately 2.5 volts for a Lithium-Ion cell. However, the predetermined voltage may vary depending on the cell type, the battery manufacturer and/or supplier, and/or a variety of other factors known in the art. If the battery voltage is not below the predetermined voltage level, the method 300 proceeds to block 308 where the method 300 ends. If the battery voltage is below the predetermined voltage level, the method 300 proceeds to block 310 where a time counter is incremented. In an embodiment, the time counter is located in the battery management unit 228. In an embodiment, each increment of the time counter is 10 milliseconds. The method 300 then proceeds to decision block 312 where it is determined whether a predetermined time period has passed. In an embodiment, the battery management unit 228 checks the time counter to determine whether the predetermined time period has passed. In an embodiment the predetermined time period is approximately 2 seconds. However, the predetermined time period may vary depending on the cell type, the battery manufacturer and/or supplier, and/or a variety of other factors known in the art. If the predetermined time period has not passed, the method 300 proceeds back to decision block 306 to again check the battery voltage level. If the predetermined time period has passed, the method 300 proceeds to block 314 where the discharge FET 226 is disabled. The battery management unit 228 may disable the discharge FET 226 such that no power may be drawn from the cell 224. The method 300 then proceeds to block 308 where the battery check ends.

If, at decision block 304, it is determined that the battery controller 220 is not operating, the method 300 proceeds to decision block 316 where it is determined whether the battery voltage is below a predetermined level. In an embodiment, the cell 224 in the battery 222 includes a battery voltage that varies as the battery is discharged. The battery management unit 228 may determine the battery voltage using methods known in the art. In an embodiment, the predetermined voltage level when the battery controller 220 is not operating is approximately 2.9 volts for a Lithium-Ion cell. However, the predetermined voltage level may vary depending on the cell type, the battery manufacturer and/or supplier, and/or a variety of other factors known in the art. If the battery voltage is not below the predetermined voltage level, the method 300 proceeds to block 318 where the method 300 ends. If the battery voltage is below the predetermined voltage level, the method 300 proceeds to decision block 320 where it is determined whether the battery discharge current is below a predetermined discharge current level. In an embodiment, the cell 224 in the battery 222 includes a battery discharge current that varies as the battery is discharged. The battery management unit 228 may determine that battery discharge current using methods known in the art. In an embodiment, the predetermined discharge current level when the battery controller 220 is not operating is approximately 100 milliamps for a Lithium-Ion cell. However, the predetermined discharge current level may vary depending on the cell type, the battery manufacturer and/or supplier, and/or a variety of other factors known in the art.

If the battery discharge current is below the predetermined level at block 320, the method 300 proceeds to block 322 where a time counter is incremented. In an embodiment, the time counter is located in the battery management unit 228. In an embodiment, each increment of the time counter is 10 milliseconds. The method 300 then proceeds to decision block 324 where it is determined whether a predetermined time period has passed. In an embodiment, the battery management unit 228 checks the time counter to determine whether the predetermined time period has passed. In an embodiment, the predetermined time period when the battery discharge current is below 100 milliamps is approximately 2 seconds. However, the predetermined time period may vary depending on the cell type, the battery manufacturer and/or supplier, and/or a variety of other factors known in the art. If the predetermined time period has not passed, the method 300 proceeds back to decision block 320 to again check the battery discharge current. If the predetermined time period has passed, the method 300 proceeds to block 326 where the discharge FET 226 is disabled. The battery management unit 228 may disable the discharge FET 226 such that no power may be drawn from the cell 224. In other words, in an embodiment, power is restricted from being drawn from the battery 220 if the battery controller 220 is not operating, the battery voltage is below 2.9 volts, and the discharge current is between 0 and 100 milliamps for over 2 seconds. The method 300 then proceeds to block 318 where the battery check ends.

If the battery discharge current is not below the predetermined level at block 320, the method 300 proceeds to block 328 where a time counter is incremented. In an embodiment, the time counter is located in the battery management unit 228. In an embodiment, each increment of the time counter is 10 milliseconds. The method 300 then proceeds to decision block 330 where it is determined whether a predetermined time period has passed. In an embodiment, the battery management unit 228 checks the time counter to determine whether the predetermined time period has passed. In an embodiment, the predetermined time period when the battery discharge current is above 100 milliamps is approximately 1 second. However, the predetermined time period may vary depending on the cell type, the battery manufacturer and/or supplier, and/or a variety of other factors known in the art. If the predetermined time period has not passed, the method 300 proceeds back to decision block 320 to again check the battery discharge current. If the predetermined time period has passed, the method 300 proceeds to block 326 where the discharge FET 226 is disabled. The battery management unit 228 may disable the discharge FET 226 such that no power may be drawn from the cell 224. In other words, in an embodiment, power is restricted from being drawn from the battery 220 if the battery controller 220 is not operating, the battery voltage is below 2.9 volts, and the discharge current is over 100 milliamps for over 1 second. The method 300 then proceeds to block 318 where the battery check ends.

It may be desirable to draw power from the battery 222 when the IHS 200 is in a reduced power mode (e.g., a shutdown mode, a standby mode, and/or a variety of other reduced power modes known in the art.) For example, U.S. patent application Ser. No. 11/897,190, filed on Aug. 29, 2007, discloses a system and method that includes the charging of a device from the battery 222 through a USB connector (e.g., the connector 204) when the IHS 200 is in a shutdown mode. However, when the IHS 200 enters a reduced power mode, the battery controller 220 may stop operating, which can allow the battery 222 to be over-discharged. Thus, a system and method are provided to restrict a battery from being over-discharged and entering an under-voltage state that can reduce the life of the battery.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A battery, comprising:
a cell; and
a battery management unit coupled to the cell, wherein the battery management unit is operable to:
determine whether a battery controller is operating when the cell is coupled to an information handling system (IHS) that includes the battery controller; and
in response to determining that the battery controller is not operating, determine whether the cell comprises a battery voltage that is below a predetermined voltage level and whether the cell is being discharged and, in response to determining that the battery voltage is below a predetermined voltage level and the cell is being discharged, restrict power from being drawn from the cell.

2. The battery of claim 1, wherein the battery management unit is operable to determine that the battery controller is not operating, that the cell comprises a battery voltage that is below the predetermined level, and that the cell is being discharged when the IHS is in a reduced power state.

3. The battery of claim 1, further comprising:
a discharge field effect transistor (FET) coupled to the cell, wherein the battery management unit is operable to disable the discharge FET in response to determining that the battery voltage is below the predetermined voltage level.

4. The battery of claim 1, wherein the battery management unit is operable to determine whether the cell comprises a battery discharge current that is below a predetermined discharge current level in response to determining that the battery voltage is below the predetermined voltage level.

5. The battery of claim 4, wherein the predetermined discharge current level is approximately 100 milliamps.

6. A battery, comprising:
a cell; and
a battery management unit coupled to the cell, wherein the battery management unit is operable to:
determine whether a battery controller is operating when the cell is coupled to an information handling system (IHS) that includes the battery controller;
in response to determining that the battery controller is not operating, determine whether the cell comprises a battery voltage that is below a predetermined voltage level; and
in response to determining that the battery voltage is below the predetermined voltage level, determine whether the cell comprises a battery discharge current that is below a predetermined discharge current level, wherein in response to determining that the battery discharge current is below the predetermined discharge current level, the battery management unit is operable to determine whether the battery discharge current has been below the predetermined discharge current level for a predetermined amount of time.

7. The battery of claim 1, wherein the predetermined voltage level is approximately 2.9 volts.

8. An information handling system (IHS), comprising:
a chassis;
a processor mounted in the chassis;
a battery controller coupled to the processor;
a battery located in the chassis and coupled to the battery controller, wherein the battery is operable to be discharged when the IHS is in a reduced power state; and
a battery management unit, wherein the battery management unit is operable, while the IHS is in a reduced power state, to:
determine whether the battery controller is operating; and
in response to determining that the battery controller is not operating, determine whether the battery comprises a battery voltage that is below a predetermined voltage level and whether the battery is being discharged.

9. The system of claim 8, wherein the battery management unit is operable to restrict power from being drawn from the battery in response to determining that the battery voltage is below the predetermined voltage level and the battery is being discharged.

10. The system of claim 8, further comprising:
a discharge field effect transistor (FET) coupled to the battery, wherein the battery management unit is operable to disable the discharge FET in response to determining that the battery voltage is below the predetermined voltage level.

11. The system of claim 8, wherein the battery management unit is operable to determine whether the cell comprises a battery discharge current that is below a predetermined discharge current level in response to determining that the battery voltage is below the predetermined voltage level.

12. The system of claim 11, wherein the predetermined discharge current level is approximately 100 milliamps.

13. An information handling system (IHS), comprising:
a chassis;
a processor mounted in the chassis;
a battery controller coupled to the processor;
a battery located in the chassis and coupled to the battery controller; and
a battery management unit, wherein the battery management unit is operable to:
determine whether the battery controller is operating;
in response to determining that the battery controller is not operating, determine whether the battery comprises a battery voltage that is below a predetermined voltage level;
in response to determining that the battery voltage is below the predetermined voltage level, determine whether the cell comprises a battery discharge current that is below a predetermined discharge current level wherein, in response to determining that the battery discharge current is below the predetermined discharge current level, the battery management unit is operable to determine whether the battery discharge current has been below the predetermined discharge current level for a predetermined amount of time.

14. The system of claim 8, wherein the predetermined voltage level is approximately 2.9 volts.

15. The system of claim 8, wherein the battery management unit is operable to determine whether the battery voltage is below the predetermined voltage level in response to the battery management unit determining that the battery controller is operating.

16. The system of claim 15, wherein the battery management unit is operable to restrict power from being drawn from the battery in response to determining that the battery voltage is below the predetermined voltage level.

17. A method for battery under-voltage protection, comprising:
providing an information handling system (IHS) comprising a battery controller and a battery coupled to the battery controller;
determining, while the IHS is in a reduced power state, whether the battery controller is operating; and
in response to determining that the battery controller is not operating, determining, while the IHS is in a reduced power state, whether the battery comprises a battery voltage that is below a predetermined voltage level and whether the battery is being discharged.

18. The method of claim 17, further comprising:
restricting power from being drawn from the battery in response to determining that the battery voltage is below the predetermined voltage level and the battery is being discharged.

19. The method of claim 17, further comprising:
determining whether a battery discharge current is below a predetermined discharge current level in response to determining that the battery voltage is below the predetermined voltage level.

20. A method for battery under-voltage protection, comprising:
providing an information handling system (IHS) comprising a battery controller and a battery coupled to the battery controller;
determining whether the battery controller is operating;
in response to determining that the battery controller is not operating, determining whether the battery comprises a battery voltage that is below a predetermined voltage level;
in response to determining that the battery voltage is below the predetermined voltage level, determining whether a battery discharge current is below a predetermined discharge current level; and
in response to determining the battery discharge current is below the predetermined discharge current level, determining whether the battery discharge current has been below the predetermined discharge current level for a predetermined amount of time.

* * * * *